United States Patent [19]
Dismore

[11] 3,710,945
[45] Jan. 16, 1973

[54] PRESERVATION OF POLYAMIDIC MEMBRANES

[75] Inventor: Paden F. Dismore, Wilmington, Del.

[73] Assignee: E. I. du Pont de Nemours and Company, Wilmington, Del.

[22] Filed: Nov. 26, 1969

[21] Appl. No.: 880,300

[52] U.S. Cl. .....................210/321, 210/500, 264/41
[51] Int. Cl. ...........................................B01d 31/00
[58] Field of Search ....210/22, 23, 321, 500; 264/41, 264/49

[56] References Cited

UNITED STATES PATENTS

| | | | |
|---|---|---|---|
| 1,057,823 | 4/1913 | Grenet | 210/490 |
| 3,423,491 | 1/1969 | McLain et al. | 264/49 |
| 3,546,209 | 12/1970 | Lipps, Jr. | 264/4 X |
| 3,551,331 | 12/1970 | Cescon et al. | 210/500 X |
| 3,565,259 | 2/1971 | Meyer-Berge | 210/500 |
| 3,567,632 | 3/1971 | Richter et al. | 210/500 X |
| 3,592,672 | 7/1971 | Rowley et al. | 210/500 X |

OTHER PUBLICATIONS

Investigation and Preparation of Polymer Films for Saline Water Conversion, Office of Saline Water R&D Report No. 61, April 1962, pp. 1-12 relied on.
Vos et al., "Drying Cellulose Acetate Reverse Osmosis Membranes," from I&EC Product Research and Development, Vol. 8, No. 1, March 1969, pp. 84-89 relied on.

Primary Examiner—Frank A. Spear, Jr.
Attorney—Louis H. Rombach

[57] ABSTRACT

Selectively permeable, polymeric membranes for use in the reverse osmosis separation of components of aqueous mixtures and solutions, particularly saline and brackish water, are chemically treated to preserve their permeability characteristics and to protect against loss thereof during the obtention of a watertight seal with the potting compounds generally employed in permeation separation devices. The desired results are achieved by effecting a substantial replacement of membrane-associated water with an inert organic medium exhibiting a lower volatility than water. Depending on the degree of hydrophilicity and water solubility of the organic medium, replacement of the membrane-associated water is accomplished by direct contact including successive contacts of the water-wet membrane with aqueous solutions of increasing organic medium concentration and/or indirect contact including successive contacts of the membrane with organic media of decreasing hydrophilicity. Reversal of the replacement process to reintroduce water to the membrane structure restores the operability of the members and renders them effective for their intended desalination and purification functions.

31 Claims, 4 Drawing Figures

INVENTOR
PADEN F. DISMORE

BY 
ATTORNEY

INVENTOR
PADEN F. DISMORE

BY  *Morris Wiseman*

ATTORNEY

PRESERVATION OF POLYAMIDIC MEMBRANES

BACKGROUND OF THE INVENTION

1. Field of the Invention

This invention relates to the preservation of polymeric membranes and particularly, to the preservation of operational characteristics of selectively permeable, polyamidic membranes for use in the reverse osmosis separation of components of aqueous mixtures and solutions. More particularly, the invention relates to a method for treating highly hydrophilic substituted, polyamidic membranes to substantially replace membrane-associated water with an organic medium to preserve permeability characteristics and to protect against their loss during sealing with hydrophobic potting compounds employed in commercially useful permeation separation devices and to the treated polyamidic membranes resulting therefrom.

2. Description of the Prior Art

Selectively permeable or semipermeable membranes are well known in the prior art and comprise structures which permit smaller molecules to pass through while denying passage to larger molecules. Such membranes have for many years been the subject of considerable investigation and study in efforts to improve their operational characteristics and to develop their use in permeation separation devices. The already developed art encompasses a diversity of known membranes which have, to a greater or lesser degree, the property of being selectively permeable to different components of fluid mixtures and solutions. Thus, some membranes, of the type referred to as osmotic membranes, will pass water but restrain ions. Other membranes, known as ion exchange membranes, will selectively pass ions in solution. Still other membranes possess selective permeation rates for two or more non-ionic components of fluid mixtures. Yet another type of membrane, the so-called molecular sieve type, tends to restrain passage of high molecular weight components or, similarly, pass only certain molecular weight fractions of given materials.

The present invention is concerned with synthetic membranes which exhibit selective permeability under conditions prevailing during operation of the so-called reverse osmosis or ultrafiltration process. Basic to an understanding of such process is the phenomenon of osmosis. As an example of the phenomenon of osmosis, if a fluid that contains water as a solvent with ions in solution is placed on one side of a selectively permeable membrane, and the water solvent alone is placed on the other side of the membrane, a transfer of water molecules will occur from the latter side through the membrane to the ionic solution. The pressure causing this transfer is a measurable value varying with the character and concentration of the fluid, and the value that just prevents further transfer is called the osmotic pressure of the solution.

If there is now applied to the ionic solution a pressure in excess of its osmotic pressure, the process of reverse osmosis will occur. In the foregoing example, solvent from the ionic solution will be forced through the membrane. It is readily apparent therefrom and in view of the low energy requirements involved that the process of reverse osmosis represents an attractive and promising application in the field of permeability separation, and in particular, in the separation of the components of aqueous solutions, such as saline and brackish waters.

The controlling factor in effecting such a separation is the permeation membrane itself. It must have a characteristic selectivity for performing a useful separation, that is, pass some components of the solution to be separated, while holding back others. Furthermore, it must have sufficient mechanical strength to withstand pressure under the conditions of separation, and it must have a sufficient fluid passage rate to accomplish its characteristic separation in a practical period of time. It must also be formed from a material having sufficient chemical and physical stability to maintain these desirable properties under use conditions for an economically feasible period of time.

These desirable characteristics are affected by both the material from which the membrane is formed and the physical configuration of the membrane. Membranes developed heretofore have generally had thin film, hollow fiber or tubular physical configurations. Probably the best known configuration is the thin flat film or uniplanar form taught by Loeb et al. in U.S. Pat. No. 3,133,132. As disclosed therein, thin film membranes may be produced from a casting solution comprising water, a solution of cellulose acetate in a suitable solvent, and a pore producing agent, the function of the latter being essential to structurally associate the water with the membrane to obtain desired permeability characteristics. Suitable permeators for using these thin film membranes are disclosed by Michaels in U.S. Pat. No. 3,173,867 and Huffman in U.S. Pat. No. 3,323,652.

The next most common physical configuration of membranes comprises hollow fiber membranes, generally formed from a water-permeable material. Mahon, in U.S. Pat. Nos. 3,228,876 and 3,228,877, and Maxwell et al., in U.S. Pat. No. 3,339,341, disclose cellulosic and polymeric membranes having a hollow fiber configuration for use in permeators for fluid separation processes. These permeators may contain one or more bundles of hollow fibers, while each bundle may comprise millions of individual fibers. One or both ends of a bundle may be potted or embedded in a suitable potting compound, generally a hydrophobic material such as an epoxy resin, and the bundle then enclosed in a housing with appropriate inlet and outlet means. The resulting permeator resembles a shell-and-tube heat exchanger. An aqueous mixture or solution is passed into the shell side of the housing under pressure and purified water is obtained from the open ends of the hollow fibers through the tube side of the housing. A variation of this design is disclosed in British Pat. No. 1,019,881 in which the hollow fibers are in the form of a U-shaped bundle with all fiber ends potted in the same end member. Hollow fibers serving as the basis for such membranes may themselves be prepared by solution spinning as disclosed in British Pat. No. 514,638 or by melt spinning as disclosed in French Pat. No. 990,726, British Pat. Nos. 843,179 and 859,814, and by Breen et al. in U.S. Pat. No. 2,999,296.

The U.S. Patent to Maxwell et al., infra, discloses that tubular membrane collections having coextensive tubular sheath elements have been utilized in prior art separatory procedures.

In all of the aforementioned membranes, once the required operational characteristics are attained, it is necessary to keep the membranes in an aqueous medium, or to prevent loss of water from the membrane until put into use. If the membranes are allowed to dry, i.e., experience a substantial reduction in their membrane-associated water, their unique properties of permeability and selectivity are greatly changed, usually in a very undesirable manner. The most common effect is a diminution of the permeability or water passage of the membrane, thereby seriously decreasing its usefulness. Consequently, membranes intended for desalination or similar use are generally handled and shipped while in contact with aqueous media, and maintained in contact therewith until ready for their intended function.

This situation is particularly objectionable where sealing of the membranes in watertight relationship to one another or to different parts of permeation separation devices is necessary. Such sealing is generally effected by embedding the end portions of the membranes in a potting compound which is usually hydrophobic in nature and under conditions of pressure and heat which render the maintenance of an aqueous environment difficult. The difficulties of effecting proper sealing are more fully discussed in U.S. Pat. No. 3,339,341, infra, where a procedure for casting the potting compound is disclosed.

Recent developments in the production of purified water from saline and brackish waters by reverse osmosis using cellulose acetate membranes have sought to avoid the necessity of such membranes being stored in water after obtention of operational characteristics. Martin, in U.S. Pat. No. 3,373,056, discloses one such development wherein highly hydrophilic substituted, cellulose acetate membranes are treated with an aqueous solution of a small amount of a modifier such as polyvinyl methyl ether or other material effective to plug small holes and more open permeation sites. Such treatment is shown to permit storage with exposure to laboratory air for two weeks without deleterious effect on permeability and salt retention characteristics when rewetted and placed in use in a reverse osmosis, permeability separation device. In view of the relatively small amount of modifier in the treating solution and in view of the peculiar nature of the modifier employed, e.g., polymeric molecule, insoluble powder, gel, colloid, it may be theorized that the hydrophilic substitution of the membranes is substantially undisturbed and that the modifier plugs in the membrane serve as a sealant or coating to prevent evaporative loss of such hydrophilic substitution. It may also be theorized that the modifier plugs are affixed essentially to the membrane surface and may be subject to flaking and powdering as well as simple mechanical dislodgment during shipping and handling.

While the cellulosic ester membranes, such as those recommended for treatment in U.S. Pat. No. 3,373,056, infra, have generally been regarded as the best overall membrane materials available, it is well known that such materials have short useful lives. Other materials, such as the polyamides, including the aliphatic and aromatic polyamides as well as the polyhydrazides, are known to be more durable, but until recently, e.g., Cescon and Hoehn U.S. Pat. No. 3,551,331, have not exhibited satisfactory water permeability and salt retention characteristics.

SUMMARY OF THE INVENTION

The invention is directed to a selectivity permeable, polymeric membrane adapted for use in combination with apparatus for the reverse osmosis separation of components of aqueous mixtures when such membrane is structurally associated or swollen predominantly with water, hereinafter referred to as a highly hydrophilic substituted membrane, and characterized by improved preservation of operational characteristics, said membrane being highly substituted, i.e., structurally associated or swollen, with an inert organic medium less volatile than water and capable of wetting said membrane and to such a membrane characterized by improved protection against the loss of operational characteristics during sealing with hydrophobic potting compounds employed in said apparatus.

The invention is further directed to a method of preserving operational characteristics of selectively permeable, polymeric membranes adapted for use in combination with apparatus for the reverse osmosis separation of components of aqueous mixtures, said method comprising substantially replacing membrane-associated water with an inert organic medium less volatile than water and capable of wetting said membrane and to such a method characterized by providing improved protection against the loss of operational characteristics during sealing of said membranes with hydrophobic potting compounds employed in said apparatus.

The invention is based on the concept that diminution of permeability and other detrimental changes in operational characteristics of selectively permeable, highly hydrophilic substituted, polymeric membranes which attend evaporative loss of membrane-associated water can be significantly reduced or avoided by substantially replacing such water with less volatile organic media. Incorporation of the organic media within the membrane structure has the distinct advantage of achieving a relative stabilization of operational characteristics unaffected by shipping and handling and thereby preserving substantially the permeability and other essential membrane properties during periods and under conditions which would normally prove detrimental thereto.

The inventive concept may be extended to promote the retention of operational characteristics of the membranes during the obtention of a watertight seal with the hydrophobic potting compounds generally employed in hollow fiber permeation separation devices by providing the active fiber length with protection against drying while the potting area, i.e., the exterior surface of the hollow fibers making contact with the potting compound, is substantially freed from any contaminants, including water and the substituting medium, prior to potting.

DETAILED DESCRIPTION OF THE INVENTION

Polyamidic Membranes

The selectively permeable membranes which may be treated in accordance with the present invention to improve the preservation of their reverse osmosis, operational characteristics and to permit the obtention of a watertight seal with the hydrophobic potting compounds usually employed in permeation separation devices without substantial loss of such characteristics are prepared from polymeric resins, particularly those comprising polyamides. The term "polyamides" is defined herein as generic to aliphatic and aromatic polyamides as well as polyhydrazides and poly(amide-hydrazides).

Aliphatic polyamides suitable for the practice of the invention are substantially linear and include the polymers disclosed by Carothers in U.S. Pat. Nos. 2,071,253; 2,130,523 and 2,130,948. Such polymers are characterized by at least one recurring group in the polymer chain selected from $$-R-\overset{O}{\underset{\|}{C}}-\overset{X}{\underset{|}{N}}- \quad \text{or} \quad -\overset{X^1}{\underset{|}{N}}-R^1-\overset{X^2}{\underset{|}{N}}-\overset{O}{\underset{\|}{C}}-R^2-\overset{O}{\underset{\|}{C}}-$$

where

R, $R^1$ and $R^2$ = divalent aliphatic radicals

X, $X^1$ and $X^2$ = hydrogen atoms or monovalent saturated aliphatic hydrocarbon radicals containing one to about four carbon atoms, the number of hydrogen atoms being at least about one-half of the number of hydrocarbon radicals.

High molecular weight film- and fiber-forming polyamides of the above structure are commonly known as nylons and may be generally prepared by the homopolymerization of an aliphatic monoaminocarboxylic acid or derivative thereof including the corresponding lactam or by the condensation of an aliphatic diamine, e.g., hexamethylene diamine, with an aliphatic dicarboxylic acid, e.g., adipic acid.

Aromatic polyamides which may be utilized to practice the present invention include the polymers described by Kwolek et al. in U.S. Pat. No. 3,063,966. Such polymers are characterized by the following recurring group in the polymer chain $$-\overset{H}{\underset{|}{N}}-Ar_1-\overset{H}{\underset{|}{N}}-\overset{O}{\underset{\|}{C}}-Ar_2-\overset{O}{\underset{\|}{C}}-$$

where $Ar_1$ and $Ar_2$ = substituted or unsubstituted divalent aromatic radicals wherein the chain-extending bonds are oriented meta or para to each other and any substituents attached to the aromatic nucleus are not condensed with reactants during polymerization.

Wholly aromatic film- and fiber-forming polyamides of this structure may be generally prepared by the condensation of an aromatic diamine and an aromatic diacid halide. Illustrative of such condensation is the interaction of meta phenylene diamine and phthaloyl chloride, e.g., a mixture of isophthaloyl and terephthaloyl chlorides.

Polyhydrazides within the scope of the invention embrace high molecular weight aromatic condensation polymers derived from hydrazine which are film- and fiber-forming. Preferred polymers of this type are disclosed by Frazer in U.S. Pat. No. 3,130,182 and are characterized by the following recurring structural unit $$-Ar-\overset{O}{\underset{\|}{C}}-NH-NH-\overset{O}{\underset{\|}{C}}-$$

where

Ar = a divalent aromatic radical having at least three nuclear atoms between points of attachment; at least 35 mol percent of the aromatic radicals in any polyhydrazide being other than para-phenylene radicals.

Preferred polymers exhibiting this structure include the condensation products of hydrazine or aromatic dihydrazides, e.g., a 50:50 weight ratio mixture of isophthalic dihydrazide and ethylene bis-4-benzoyl hydrazide, and aromatic diacid chlorides, e.g., a 70:30 weight ratio mixture of isophthaloyl chloride and terephthaloyl chloride.

Poly(amide-hydrazides) suitable for the practice of the invention include polymers containing both amide and hydrazide linking groups. Preferred polymers of this type are disclosed by Richter and Hoehn in U.S. Pat. No. 3,567,632 and are characterized by recurring amide and hydrazide structural units. Preferred polymers exhibiting this structure include those obtained by condensation of one or more diacid chlorides, e.g., a mixture of 50 to 90 percent by weight of isophthaloyl chloride, balance terephthaloyl chloride, with m-phenylene diamine and at least one dihydrazide, e.g., ethylene-1-(3-oxybenzoic)-2-(4-oxybenzoic) dihydrazide.

The polymeric membranes which may be preserved by the present invention may be in the form of flat films or hollow fibers having water structurally associated therewith. The resultant highly hydrophilic substituted polymeric membranes may be produced as disclosed in U.S. Pat. No. 3,551,331 by forming into the desired configuration and subsequently treating with acidic materials to improve permeability. Alternatively, the highly hydrophilic substituted polymeric membranes may be produced as described in U.S. Pat. No. 3,567,632 by dissolving the polymeric material in an organic solvent, partially removing the solvent by evaporation, forming a desired configuration from the resultant material, and replacing the organic solvent with water. In either case the resultant membrane is characterized by permeability and salt rejection properties dependent upon the membrane-associated water. Such membranes experience evaporative weight loss and degradation of reverse osmosis operational characteristics upon drying and, as aforementioned, are herein referred to as "highly hydrophilic substituted membranes".

Organic Replacement Media

The organic media employed to replace the membrane-associated water in the practice of the present invention are essentially less volatile than water and capable of wetting the membrane with which they, in turn, are intended to structurally associate. The lower volatility of the replacement media provides a smaller evaporative loss under given temperature conditions. The wetting ability of the organic media is necessary to permit impregnation of the membrane and replacement of the membrane-associated water. It is essential, of course, that the organic medium be inert with respect to the membrane in the sense that it does not dissolve or react therewith.

Preferred organic replacement media have boiling points above 180°C. and may comprise inert organic hydrophilic or hydrophobic materials.

Inert organic hydrophilic materials suitable for the practice of the invention include the common water-soluble glycols, esters, ethers and ketones. Illustrative specific materials of this type include ethylene glycol, diethylene glycol, triethylene glycol, trimethylene glycol, tetramethylene glycol, pentamethylene glycol, propylene glycol, n-amylene glycol, isoamylene glycol, hexamethylene glycol, glycerine, methyl glycerate, ethyl glycerate, ethyl malate, maleic anhydride, carbitol, pentaglycerol, methoxyacetophenone, phenylpropyl alcohol (n), dihydroxyethyl ether (B,B'), xylenol(1,2,3), xylenol(1,2,4), and xylenol(1,4,3).

Inert organic hydrophobic materials that can be used generally include hydrocarbons, halogenated hydrocarbons, terpenes and similar substances. Specific examples include benzene, camphor, naphthalene and paraffin wax.

Replacement Technique

The technique employed for replacing membrane-associated water with an inert organic preserving medium is dependent primarily upon the degree of hydrophilicity and water solubility of the organic medium.

Where the organic medium is hydrophilic in nature, direct contact of the membrane therewith is usually effective to achieve the desired replacement. In such case the replacement may be effected by soaking the membrane directly in a bath consisting of the ultimate organic replacement medium, e.g., 100 percent glycerine, or by soaking the membrane successively in a series of baths consisting of aqueous solutions of increasing concentration of the ultimate organic replacement medium, e.g., aqueous solutions of 10 percent by weight glycerine, 20 percent by weight glycerine, 40 percent by weight glycerine, 60 percent by weight glycerine, and 80 percent by weight glycerine, the final bath being 100 percent glycerine. It is, of course, obvious that one can halt the replacement at any desired intermediate level, e.g., 20 percent by weight glycerine.

When the organic replacement medium is hydrophobic in nature, it is often more effective to indirectly contact the highly hydrophilic substituted membrane therewith by successively contacting such membrane with baths of organic media of decreasing hydrophilicity, the final bath of the series being the desired ultimate organic preservation medium. As an illustration thereof, a highly hydrophilic substituted membrane may be soaked in a series of baths comprising in succession methanol, benzene, a solution of 20 percent by weight paraffin in benzene, and 100 percent paraffin. Another illustration may include a series of baths consisting successively of methanol, benzene, and a solution of 62 percent by weight camphor in naphthalene. It should be pointed out that where a normally solid material is employed in a membrane-contacting bath, as in the case of paraffin or naphthalene, the bath material is warmed just enough to maintain it in a molten state, care being taken to avoid temperatures in excess of about 80° to avoid deleterious effects on the treated membrane. Generally, however, the replacement technique is effected preferably at room temperature or lower.

The replacement technique employed in the practice of the invention is amenable to batch or continuous process operations. Accordingly, the organic replacement medium may be applied to the polymeric membrane by running the membrane material through a single bath or series of baths, or the membrane may be wound up, knit or otherwise formed into packages while wet with water and then treated in a batch process with the organic replacement medium, it being understood that treatment of packages entails a somewhat lengthier period of time to insure adequate replacement since there is a less direct accessability of the fibers comprising same.

Permeation Properties

The rate at which water passes through a membrane is conveniently expressed in terms of water permeability. The term "water permeability", as used herein, is defined as the number of gallons of water per day which passes through one thousand square feet of membrane under the influence of an effective reverse osmosis pressure of 1,000 psi. It may be calculated by the equation:

$$\text{Water permeability } (W_m) = \frac{\text{gallons of water permeate}}{\text{days} \times \text{sq. ft.} \times \text{p.s.i.}} \times 10^6$$

in which the pressure, psi., is the difference in hydraulic pressure between the two surfaces of the membrane corrected for the osmotic pressure due to the difference in salt concentration of the solutions in contact with the two surfaces of the membrane.

The square feet of membrane used in the water permeability calculation is conveniently based on the surface area of flat film exposed to the feed water. In the case of a hollow fiber, the surface area may be regarded as the average of the areas of the inner and outer surfaces of the hollow fiber wall. The hollow fiber surface area may be determined with an accuracy suitable for insertion in the above water permeability equation by the following simplified equation:

$$\text{sq. ft.} = \frac{\pi (D_0 + D_i) L}{2}$$

in which $D_o$ is the outer diameter in feet of the hollow fiber, $D_i$ is the inner diameter in feet of the hollow fiber, and $L$ is the length in feet of the hollow fiber.

The rate at which salt is rejected by reverse osmosis membranes is conveniently expressed in terms of salt rejection. The term "salt rejection", as used herein, is defined as the percentage of the salt in the feed water rejected by the membrane. It may be calculated by the equation:

$$\text{Salt rejection (percent S.R.)} = \left(1 - \frac{\text{salt concentration in permeate}}{\text{salt concentration in feed}}\right) \times 100$$

The concentration of the salt in the permeate may be determined conductometrically or by chemical analysis.

Figure 1:
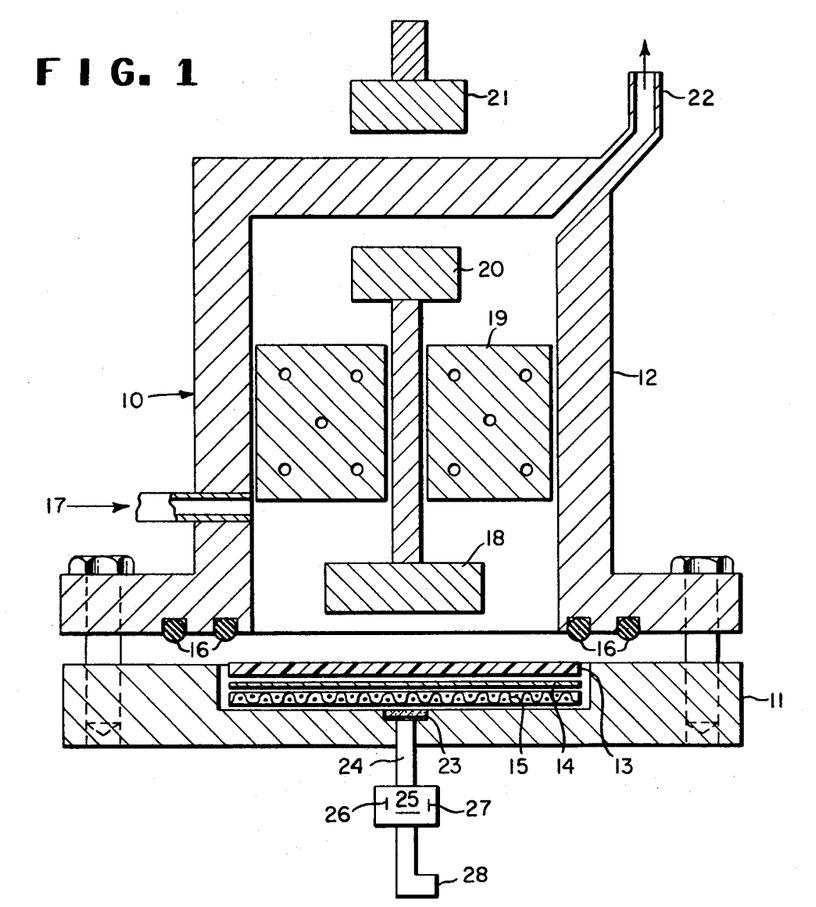
FIG. 1 is a cross-sectional view in elevation of a permeation test cell for thin flat film or uniplanar membranes.
Figure 2:
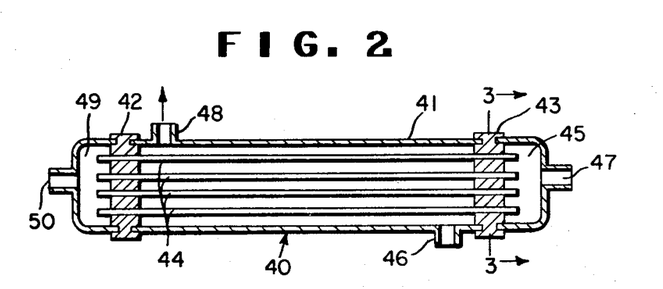
FIG. 2 is a cross-sectional, side view of a permeation test cell for hollow fiber membranes.

The permeation test cells of FIGS. 1 and 2 may be used to determine the water permeabilities and salt rejection rates of film and hollow fiber membranes, respectively. Referring now to FIG. 1, base section 11 and upper section 12 of permeation cell 10 are machined from blocks of rust-proof metal. Film 13, the reverse osmosis membrane, is a disk mounted on a layer of filter paper 14 against a stainless steel wire screen 15. When upper section 12 of the cell is bolted to lower section 11, synthetic elastomer O-rings 16 seat firmly around the periphery of the membrane and against the metal. Inlet 17 for feeding fluid into the cell is near the membrane. The fluid is agitated by a magnetically driven stirrer blade 18, positioned by support 19 and controlled by external and internal magnets 20 and 21 to ensure contact of fresh fluid with the membrane surface at all times. Recirculation of the feed fluid is provided through the feed exit 22. Fluid passing through membrane 13 is collected through a metal frit 23 into a small conductivity cell 25 where electrical connections 26 and 27 permit determination of salt content to be made by means of a conductivity bridge (not shown). From conductivity cell 25 the fluid passes into pipe 28 where its volume and flow rate are observed. Other test cells of similar design, which avoid the development of a stagnant layer of concentrated salt solution near the membrane, may also be used.

FIG. 2 shows a permeation cell suitable for use with hollow fiber membranes. In permeation cell 40, casing 41 contains hollow fiber bundle 44 which is potted in end plugs 42 and 43. One end of bundle 44 extends through end plug 43 into collecting chamber 45 and the other through plug 42 into chamber 49. Fluid is fed into cell 40 through feed inlet 46, permeates through the walls of the fibers, passes through the hollow interior thereof into collection chambers 45 and 49 and is withdrawn through exits 47 and 50. Excess fluid not permeated is withdrawn through casing exit 48.

Figure 3:
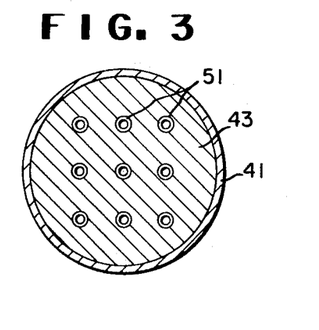
FIG. 3 is a sectional view through 3—3 of FIG. 2.

FIG. 3 illustrates a section through plug 43 of a cell similar to that of FIG. 2, and shows the hollow ends of individual fibers 51 (not to scale) extending through plug 43 mounted in casing 41. It will be understood that bundle 44 may actually contain millions of fibers.

An epoxy resin suitable for potting the ends of bundle 44 thereby forming plugs 42 and 43 can be prepared by mixing 100 grams of an epoxy polymer modified with butyl glycidyl ether ("ERL 2795", Smooth-On Manufacturing Company), 16 grams of a modified aliphatic amine adduct ("Sonite 15", Smooth-On Manufacturing Co.), and 20 grams of triphenyl phosphite ("Mod-Epox", Monsanto). The resin is cast around the fiber ends in a suitable mold immediately after mixing and the resin is allowed to set up by storing at room temperature for 16 to 24 hours.

Figure 4:
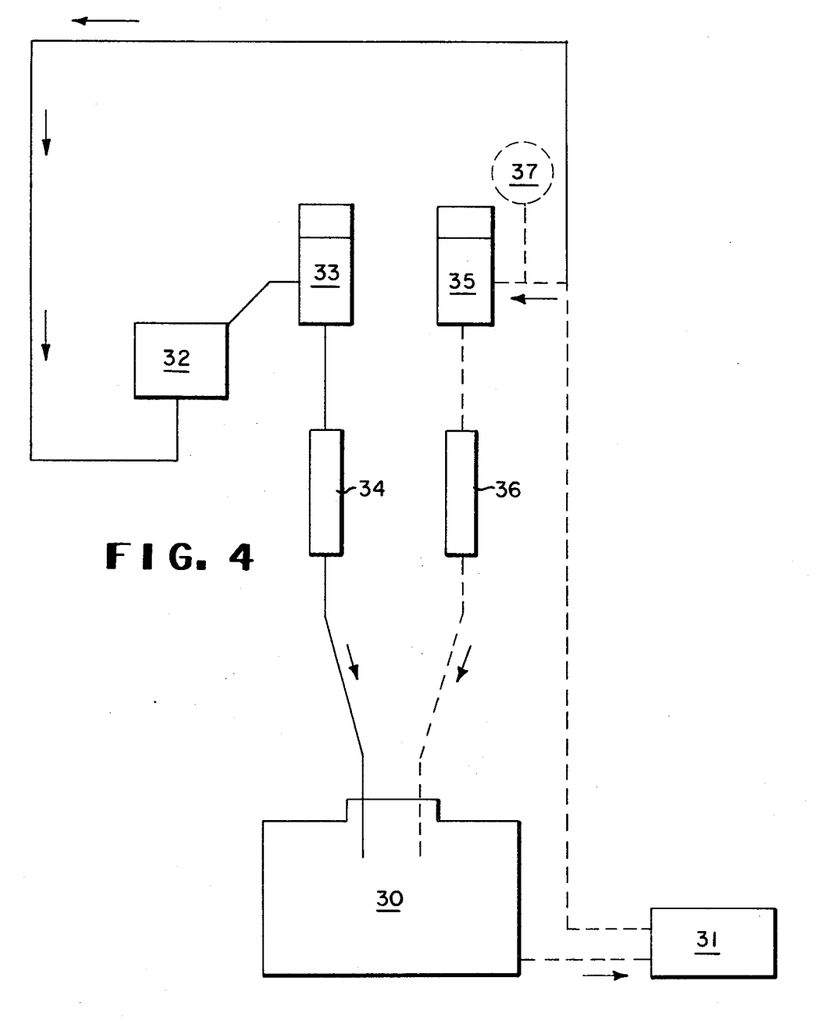
FIG. 4 is a flow diagram of a pumping and control system for determining operational characteristics of permeation test cells.

FIG. 4 shows a pumping system for providing circulation of feed fluid and maintenance of pressure inside the permeation cell during water permeability and salt rejection determination. Fluid is circulated from reservoir 30 by pump 31 through the cell represented by block 32, which may be the cell of either FIG. 1 or FIG. 2, pressure regulator 33, flow meter 34 and back to reservoir 30. Temperature is controlled as desired by placing the cell and permeate measuring equipment in an air bath (not shown) monitored by a thermocouple (also not shown) mounted adjacent to the test film inside the cell. Alternatively, the cell may be placed in a water bath. Regulator 35 and flow meter 36 permit excess fluid from the pump to by-pass the permeation cell and return to the reservoir. Pressure is monitored by gauge 37. Conventional piping is, of course, supplied to connect the units of the control system as indicated.

EXAMPLES

The following examples illustrate the practice of the invention and provide a comparative basis for evaluation. Unless otherwise stated, the bath composition is given in weight percent and treatment is at room temperature.

EXAMPLE 1

Selectively permeable membranes were prepared by treating polymer films, formed from the condensation product of hexamethylene diamine and adipic acid, with an aqueous solution of 62 percent formic acid in the manner described in the Cescon and Hoehn U.S. Pat. No. 3,551,331. Specifically, the polymer films were soaked in the formic acid solution for one hour and then thoroughly washed with deionized water.

A first portion of the membrane, designated as Sample 1A, was allowed to dry at room temperature for several days.

A second portion of the membrane, designated as Sample 2A, was preserved in water until tested for permeation properties.

A third portion of the membrane, designated as Sample 3A, was allowed to dry at room temperature for several days after being treated in accordance with the following schedule:

| Soaking Period (hours) | Bath Composition (volume percent) | |
|---|---|---|
| | Glycerine | Water |
| 4 | 10 | 90 |
| 64 | 20 | 80 |
| 5 | 40 | 60 |
| 3½ | 60 | 40 |
| 16 | 80 | 20 |
| 4 | 100 | — |

The three membrane samples were then tested for permeation properties as described herein at an applied pressure, using brackish sulfate solution containing 206 ppm. $Ca^{++}$, 137 ppm. $Na^+$, 80 ppm. $Mg^{++}$, 1,084 ppm. $SO_4^=$ at 500 psi. as test liquid. Test results obtained are set forth in Table I.

TABLE I

| Sample | $W_m$ | %SR |
|---|---|---|
| 1A | 115 | 93 |
| 2A | 660 | 82 |
| 3A* | 660 | 92 |

*Washed with water prior to testing.

EXAMPLE 2

A copolymer of meta-phenylene diamine and a mixture of isophthaloyl (70 mole percent) and terephthaloyl (30 mole percent) chloride was prepared in the manner described in U.S. Pat. No. 3,063,966, infra, by simultaneously adding to a reaction vessel fitted with a stirrer a solution of 43.9 parts of isophthaloyl chloride and 10.98 parts of terephthaloyl chloride dissolved in 1,600 parts of methylene chloride and a solution of 48.87 parts of meta-phenylene diamine hydrochloride and 109.3 parts of triethylamine dissolved in 1,600 parts of methylene chloride. An additional 400 parts of methylene chloride was used for rinse purposes and added to the reaction mass. After 10 minutes, polymer having an inherent viscosity of 1.44 and a melt temperature of 370°C. was formed.

A casting solution was then prepared by mixing 30 gms. of the prepared copolymer with 3 gms. lithium chloride and 167 gms. dimethylacetamide and used to cast a membrane on a glass plate. The thickness of the membrane was determined by using a doctor knife set at 15 mils. Curing of the membrane was effected by placing the glass plate with the cast film thereon in a vacuum oven at 140°C. for 140 minutes. Thereafter, the film and plate were immersed in ice water and film was removed and sectioned for treatment in accordance with the invention.

One part of the resultant membrane, designated as Sample 1B, was allowed to dry out at room temperature.

A second part of the membrane, designated as Sample 2B, was kept in water.

A third part of the membrane, designated as Sample 3B, was soaked in a bath of 100 percent glycerine for 19 hours and allowed to dry at room temperature for several days.

The three samples of membrane were then tested as in Example 1 except that an 0.3 percent chloride solution was employed as test liquid and a pressure of 460 psig. was applied. The results are given in Table II.

TABLE II

| Sample | $W_m$ | %SR |
|---|---|---|
| 1B | 1.4 | 94.0 |
| 2B | 630 | 87.0 |
| 3B* | 340 | 90.0 |

*Washed with water prior to testing.

EXAMPLE 3

A membrane was prepared as described in Example 1. Two portions of the membrane were used as controls as in the previous examples, one, designated as Sample 1C, being dried at room temperature, and the other, designated as Sample 2C, being kept in water.

A third portion of the membrane, designated as Sample 3C, was treated as shown in the following schedule:

| Soaking Period (hours) | Bath Composition |
|---|---|
| 1 | 99.5% methanol, balance water |
| 1 | 100% benzene |
| 68 | 20% paraffin, 80% benzene |
| 3½ | 100% paraffin* |

*Temperature at 80°C.

A fourth portion of the membrane, designated as Sample 4C, was treated in accordance with the schedule below:

| Soaking Period (hours) | Bath Composition |
|---|---|
| 1 | 99.5% methanol, balance water |
| 1 | 100% benzene |
| 68 | 62% camphor, 38% naphthalene* |

*Temperature at 80°C.

The four membrane samples were tested as in Example 1 at 500 psi. with the following results:

TABLE III

| Sample | $W_m$ | %SR |
|---|---|---|
| 1C | 110 | 97.0 |
| 2C | 470 | 89.0 |
| 3C* | 220 | 91.0 |
| 4C* | 220 | 95.5 |

*These samples were thoroughly dried after treatment and serially washed with benzene, alcohol, 50% alcohol in water, and finally in water prior to testing.

EXAMPLE 4

A test of 144 polymeric hollow fiber membranes, prepared by treating polymer fibers in a manner similar to treating polymer films in Example 1, except that 66 percent formic acid was used, was formed into a loop and treated with a polyethylene glycol of melting range 50–54°AC. ("Harleco Embedding Medium", Hartman Leddon Co., Phila, Pa.) according to the following schedule:

| Soaking Period (hours) | Bath Composition (volume percent) Polyethylene Glycol | Water |
|---|---|---|
| 18 | 10 | 90 |
| 4 | 20 | 80 |
| 3½ | 40 | 60 |
| 17 | 60 | 40 |
| 4* | 80 | 20 |
| 3* | 100 | — |

*Heated to 50°–60°C. to make fluid.

One end of the loop was then washed with water, allowed to dry for several days at room temperature and sealed into a small permeator as described herein. When tested with nitrogen gas at 1,200 psig., no leaks were observed.

Brackish sulfate solution, as in Example 1, was employed as a test liquid at an applied pressure of 600 psig. to determine the operational characteristics of these membranes in the small permeator. Another set of the membranes which had not been treated with the polyethylene glycol was kept wet with water and tested in the same way for comparison. The results are shown in Table IV with the membranes not treated with polyethylene glycol being designated as Sample 1D and the membranes treated with polyethylene glycol being designated as Sample 2D. A third set not treated with polyethylene glycol and allowed to dry is designated as Sample 3D.

TABLE IV

| Sample | Flux* | %SR |
|---|---|---|
| 1D | 0.367 | 66 |
| 2D | 0.338 | 75 |
| 3D | 0.075 | 95 |

*gallons of permeate per sq. ft. per day.

EXAMPLE 5

Samples of selectively permeable membranes were prepared as in Example 1. One sample, designated as Sample 1E, was allowed to dry at room temperature; a second sample, designated as Sample 2E, was preserved in water until tested for permeation properties; a third sample, designated as Sample 3E, was soaked in an aqueous solution containing 20 percent of the polyethylene glycol described in Example 4.

These samples were tested using a brackish sulfate test liquid as described in Example 1 at an applied pressure of 500 psig. and the results are given below:

TABLE V

| Sample | $W_m$ | %SR |
|---|---|---|
| 1E | 300 | 85.0 |
| 2E | 850 | 81.0 |
| 3E | 820 | 83.0 |

Having thus described the invention so that others skilled in the art may be able to understand and practice the same, it is expressly understood that various changes may be made in the method and membrane of this invention and that materials other than those specifically described herein may be employed as polymeric membranes and as organic replacement media without departing from the spirit and scope of the invention.

The embodiments of the invention in which an exclusive property or privilege is claimed are defined as follows:

1. A selectively permeable, polymeric polyamide membrane adapted for use in combination with apparatus for the reverse osmosis separation of components of aqueous mixtures when highly hydrophilic substituted and characterized by improved preservation of operational characteristics, said membrane being highly substituted with an inert organic medium less volatile than water and capable of wetting said membrane.

2. A membrane according to claim 1 comprising an aliphatic polyamide.

3. A membrane according to claim 2 wherein said aliphatic polyamide is characterized by at least one recurring group in the polymer chain selected from where
R, $R^1$ and $R^2$ = divalent aliphatic radicals
X, $X^1$ and $X^2$ = hydrogen atoms or monovalent saturated aliphatic hydrocarbon radicals containing one to about four carbon atoms, the number of hydrogen atoms being at least about one-half the number of hydrocarbon radicals.

4. A membrane according to claim 3 wherein said aliphatic polyamide is the homopolymerization product of an aliphatic monoaminocarboxylic acid or derivative thereof.

5. A membrane according to claim 3 wherein said aliphatic polyamide is the condensation product of an aliphatic diamine and an aliphatic dicarboxylic acid.

6. A membrane according to claim 5 wherein said aliphatic diamine is hexamethylene diamine and said aliphatic dicarboxylic acid is adipic acid.

7. A membrane according to claim 1 comprising an aromatic polyamide.

8. A membrane according to claim 7 wherein said aromatic polyamide is characterized by the following recurring group in the polymer chain where
$Ar_1$ and $Ar_2$ = substituted or unsubstituted divalent aromatic radicals wherein the chain-extending bonds are oriented meta or para to each other and any substituents attached to the aromatic nucleus are not condensed with reactants during polymerization.

9. A membrane according to claim 8 wherein said aromatic polyamide is the condensation product of an aromatic diamine and an aromatic diacid halide.

10. A membrane according to claim 8 wherein said aromatic polyamide is the condensation product of meta phenylene diamine and a mixture of isophthaloyl and terephthaloyl chlorides.

11. A membrane according to claim 1 comprising a polyhydrazide.

12. A membrane according to claim 11 wherein said polyhydrazide is characterized by the following recurring structural unit where
Ar = a divalent aromatic radical having at least three nuclear atoms between points of attachment; at least 35 mol percent of the aromatic radicals in any polyhydrazide being other than para-phenylene radicals.

13. A membrane according to claim 12 wherein said polyhydrazide is the condensation product of hydrazine and an aromatic diacid chloride.

14. A membrane according to claim 12 wherein said polyhydrazide is the condensation product of an aromatic dihydrazide and an aromatic diacid chloride.

15. A membrane according to claim 14 wherein said aromatic dihydrazide is a mixture of isophthalic dihydrazide and ethylene bis-4-benzoyl hydrazide and said aromatic diacid chloride is a mixture of isophthaloyl chloride and terephthaloyl chloride.

16. A membrane according to claim 1 comprising a poly(amide-hydrazide).

17. A membrane according to claim 16 wherein said poly(amide-hydrazide) is the condensation product of at least one diacid chloride, an aromatic amine and a hydrazide.

18. A membrane according to claim 16 wherein said poly(amide-hydrazide) is the condensation product of a mixture of 50-90 percent by weight of isophthaloyl chloride, balance terephthaloyl chloride and m-phenylene diamine and an aromatic dihydrazide.

19. A membrane according to claim 1 wherein said inert organic medium is hydrophilic and has a boiling point higher than 180°C.

20. A membrane according to claim 1 wherein said inert organic medium is hydrophobic and has a boiling point higher than 180°C.

21. A membrane according to claim 1 wherein said inert organic medium is glycerine.

22. A membrane according to claim 1 wherein said inert organic medium is paraffin wax.

23. A membrane according to claim 1 wherein said inert organic medium is naphthalene.

24. A membrane according to claim 1 wherein said inert organic medium is a mixture of camphor and naphthalene.

25. A membrane according to claim 1 wherein said inert organic medium is polyethylene glycol.

26. A membrane according to claim 1 in the form of a flat film.

27. A membrane according to claim 1 in the form of a hollow fiber.

28. A method of preserving operational characteristics of selectively permeable, highly hydrophilic substituted, polymeric polyamide membranes adapted for use in combination with apparatus for the reverse osmosis separation of components of aqueous mixtures, said method comprising substantially replacing membrane-associated water with an inert organic medium less volatile than water and capable of wetting said membranes.

29. A method according to claim 28 wherein replacement of membrane-associated water is effected by contacting the highly hydrophilic substituted membranes with an aqueous solution of a hydrophilic organic medium having a boiling point higher than 180°C.

30. A selectively permeable, polymeric polyamide membrane adapted for use in combination with apparatus for the reverse osmosis separation of components of aqueous mixtures when highly substituted and characterized by improved preservation of operational characteristics, said membrane being highly substituted with an inert organic medium less volatile than water and capable of wetting said membrane, the membrane being further characterized by improved protection against loss of operational characteristics during sealing with hydrophobic potting compounds employed in said apparatus and having a hollow fiber configuration comprising an active length and a potting area, said active length being highly substituted with said inert organic medium and said potting area being substantially free from said inert organic medium and from water.

31. A method of preserving operational characteristics of selectively permeable, highly hydrophilic substituted, polymeric polyamide membranes having a hollow fiber configuration and adapted for use in combination with apparatus for the reverse osmosis separation of components of aqueous mixtures, said method comprising substantially replacing membrane-associated water with an inert organic medium less volatile than water and capable of wetting said membranes and thereafter substantially removing said organic replacement medium from the potting areas of preserved membranes and drying said areas to promote the sealing capability of said membranes with hydrophobic potting compounds employed in said apparatus.

* * * * *